(12) United States Patent
Garziera

(10) Patent No.: US 8,104,638 B2
(45) Date of Patent: Jan. 31, 2012

(54) SWINGING HANDLE FOR A KITCHEN VESSEL

(75) Inventor: Roberto Vincenzo Garziera, M. Zuccolo (IT)

(73) Assignee: Ballarini Paolo & Figli, S.p.A., Rivarolo Mantovano (IT)

( * ) Notice: Subject to any disclaimer, the term of this patent is extended or adjusted under 35 U.S.C. 154(b) by 1235 days.

(21) Appl. No.: 11/604,445

(22) Filed: Nov. 27, 2006

(65) Prior Publication Data

US 2007/0119856 A1 May 31, 2007

(30) Foreign Application Priority Data

Nov. 30, 2005 (IT) .............................. MI2005A2289

(51) Int. Cl.
*B65D 25/28* (2006.01)
(52) U.S. Cl. ......... 220/762; 220/769; 220/765; 220/763
(58) Field of Classification Search .................. 220/762, 220/769, 775, 765, 763
See application file for complete search history.

(56) References Cited

U.S. PATENT DOCUMENTS

| | | | | |
|---|---|---|---|---|
| 403,656 A * | 5/1889 | Gerstle | ........................ | 220/763 |
| 1,173,662 A * | 2/1916 | Hayward | ...................... | 220/763 |
| 1,480,356 A * | 1/1924 | Wegener et al. | .............. | 220/753 |
| 1,490,568 A * | 4/1924 | Koenig | ......................... | 220/762 |
| 3,082,473 A * | 3/1963 | West | ............................... | 16/445 |
| 4,724,576 A * | 2/1988 | Tatematsu | ...................... | 220/763 |
| 5,012,553 A * | 5/1991 | Hardigg et al. | ................. | 16/445 |
| 5,660,300 A * | 8/1997 | Demetrio | ...................... | 220/763 |
| 5,887,751 A * | 3/1999 | Kroscher | ...................... | 220/759 |
| 6,079,590 A * | 6/2000 | Munari | ......................... | 220/762 |
| 6,173,860 B1 * | 1/2001 | Lamers | ......................... | 220/759 |
| 6,220,477 B1 * | 4/2001 | Schneider | ..................... | 220/763 |
| RE37,518 E * | 1/2002 | Hardigg et al. | ................. | 16/438 |
| 6,581,245 B2 * | 6/2003 | Jen | ................................... | 16/408 |
| 7,090,094 B2 * | 8/2006 | Wade et al. | .................. | 220/764 |
| 7,467,730 B2 * | 12/2008 | Manke et al. | ................. | 220/760 |

\* cited by examiner

*Primary Examiner* — Anthony Stashick
*Assistant Examiner* — Christopher McKinley
(74) *Attorney, Agent, or Firm* — Kirschstein, et al.

(57) ABSTRACT

A swinging handle, which may swing with respect to a wall of a kitchen vessel, comprises an U-shape end, having free arms facing the kitchen vessel, wherein, from each end portion of the U-shape arms, mutually facing swinging pivot pins project, said pivot pins being housed in a seat of a supporting body fixed to a projection rigid with the vessel wall, the support body seat also housing herein a spring bearing with a side thereof against the bottom of the seat and by the other side thereof against one of two locating surfaces, arranged at 90° with respect to one another, and formed by an extension projecting from each swinging pivot pin.

4 Claims, 4 Drawing Sheets

SWINGING HANDLE FOR A KITCHEN VESSEL

BACKGROUND OF THE INVENTION

The present invention relates to a swinging handle for a kitchen vessel.

Prior kitchen vessels conventionally comprise kitchen vessel handles radially projecting from the vessel wall, said prior handles being made of a metal material and directly welded on the vessel wall.

Further prior kitchen vessel handles comprise a plate-like support element, rigid or integral with the kitchen vessel wall, with their metal plate coupled to a synthetic material body.

The above two prior handles have the drawback that, since they radially project from the kitchen vessel, such a handled kitchen vessel will occupy a comparatively large space as it is stored, for example, in a storing drawer.

Moreover, for stacking onto one another a plurality of kitchen vessels, a large space is further required since, because of the provision of the radially projecting handles, it would not be possible to overlap several kitchen vessels of decreasing diameters in a small storing space.

SUMMARY OF THE INVENTION

Accordingly, the aim of the present invention is to provide a kitchen vessel, having a kitchen vessel handle, which can be stored in a small space inside a storing drawer of a kitchen furniture piece.

According to the present invention, that aim is achieved by a kitchen vessel handle which may swing with respect to a kitchen vessel wall, characterized in that said kitchen vessel handle comprises a U-shape end, with free arms thereof facing the vessel, that from each end of said arms mutually facing swinging pivot pins project, that said pins are housed in a support seat of a support body, that said support body is fixed to a projection rigid with the wall of the kitchen vessel, that in said support seat a spring is moreover engaged, and that said spring bears, by a side thereof, against a bottom of said support seat, and by the other side thereof, against two locating surfaces, arranged at 90° with respect to one other, and formed by an extension projecting from each said swinging pivot pin.

BRIEF DESCRIPTION OF THE DRAWINGS

Further characteristics will become more apparent from the following disclosure and the accompanying drawings.

The subject matter according to the present invention will be disclosed and illustrated in a more detailed manner hereinafter with reference to an embodiment thereof, given only by way of an example, and shown in the accompanying drawings, where.

DESCRIPTION OF THE PREFERRED EMBODIMENTS

Figure 1:
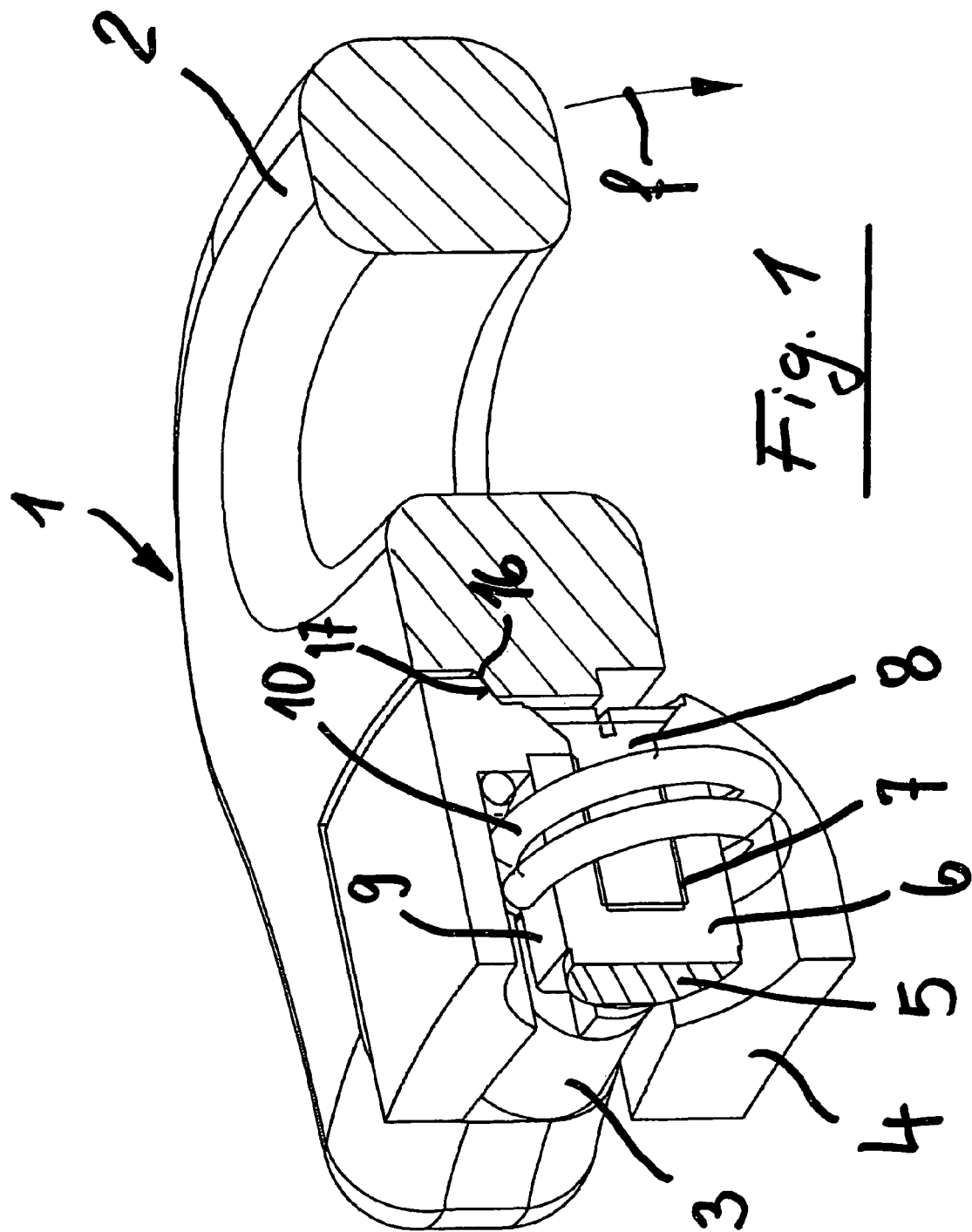
FIG. 1 shows a half of the swinging handle according to the present invention, in an use position thereof, in which said handle projects radially from the kitchen vessel.

As shown in FIG. 1, the kitchen vessel handle 1 which, for clearness, has been shown only in a half-view thereof, comprises a body 2 which is advantageously made of a synthetic thermoinsulating material.

The handle body 2 has a U-shape, and from the two end portions thereof a pivot pin 3, engaged in a seat of a support body 4, projects.

Figure 3:
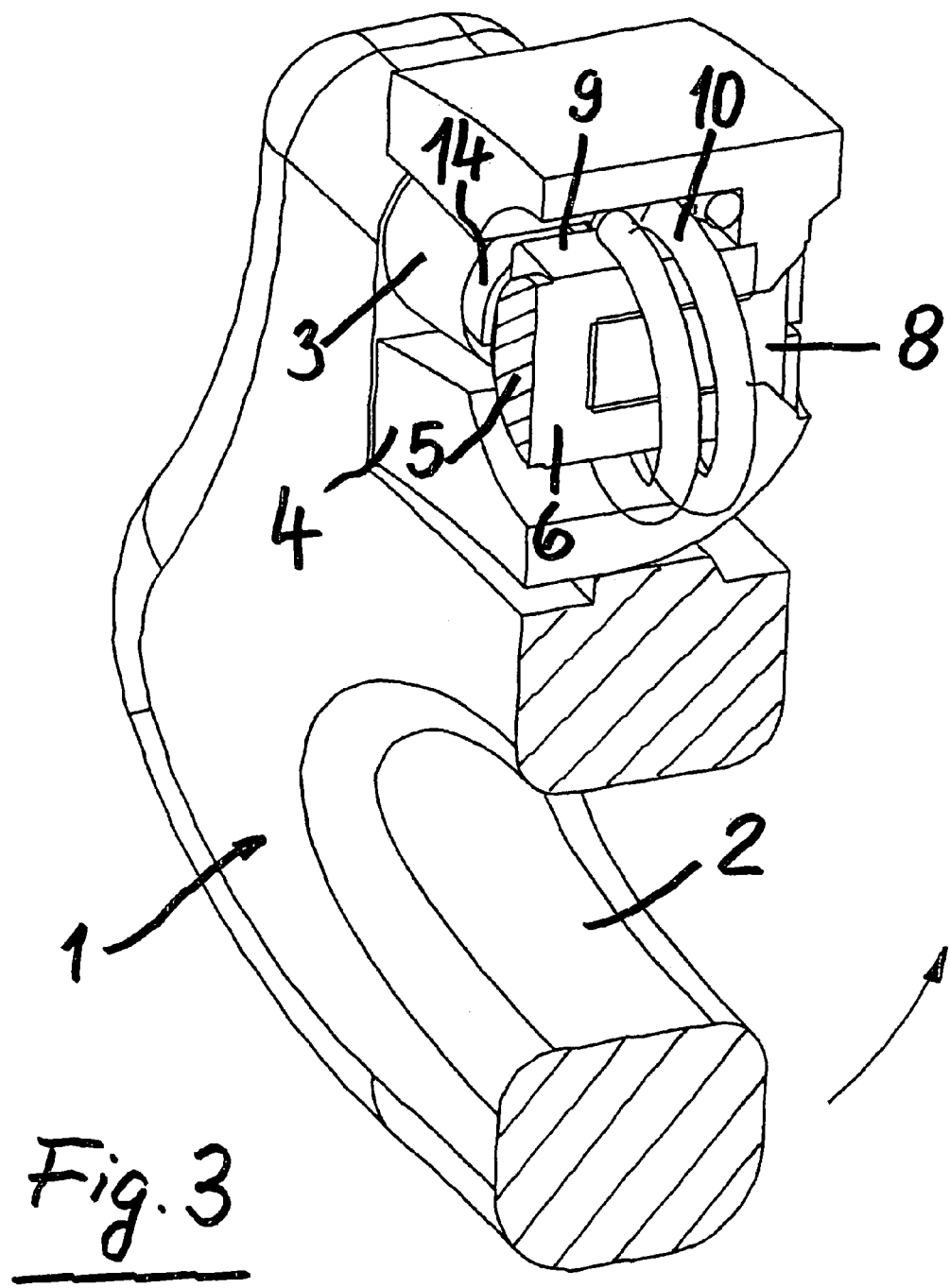
FIG. 3 shows the handle of FIG. 1 in a rest condition thereof, in which it is arranged in parallel to the kitchen vessel wall.

Thus, it is possible to cause the handle 2 to swing from an use condition, in which it projects radially from the wall of the kitchen vessel (FIG. 1), to a rest position, in which said handle is arranged in parallel to the kitchen vessel wall (FIG. 3).

A projecting portion 6 is firmly coupled to the vessel (not shown) through a coupling surface 5.

Said projection 6 comprises a threaded hole 7 therein is threaded a screw 8 for firmly clamping the support body generally indicated by 4.

Said support body 4, in addition to having a seat for engaging therein the pivot pins 3, is also provided with a chamber 9 for engaging therein a coil spring 10.

Figure 2:
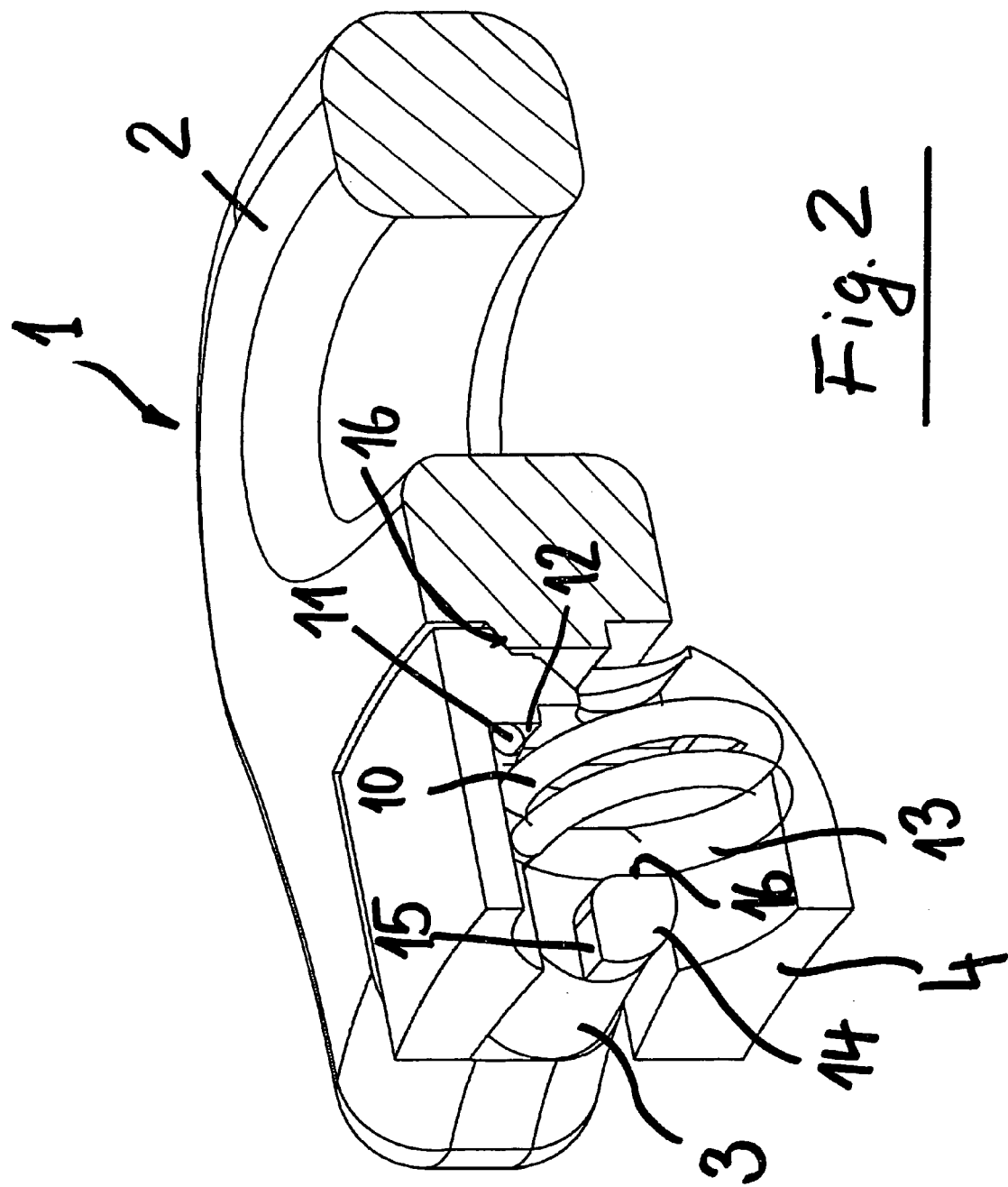
FIG. 2 shows the handle of FIG. 1, therefrom some mechanical elements have been removed for clarity reasons.

As shown in FIG. 2, the coil spring 10 bears, by an end portion 11 thereof, on the bottom or floor 12 of the chamber 9, whereas, the opposite end portion of the spring 10 bears against the surface 16 of a projection or bulged portion 14 projecting from the pivot pin 3 (FIG. 2).

As shown, said projection 14 comprises two drive and bearing surfaces 15 and 16, which are arranged perpendicular to one another.

At the opposite end portion of the pivot pin 3, the handle 2 comprises an abutment step 17, bearing against a related step 16 of the support body 4.

Thus, owing to the provision of the preloaded spring 10 arranged between the floor 12 of the chamber 9 and the projection 14, the handle 2 will be locked in a horizontal position, as shown in FIGS. 1 and 2.

By driving the handle 2 with a swinging movement, as shown by the arrow (f) in FIG. 1, the spring 10 is pressed to cause the step 17 of the handle 2 to disengage from the abutment 16 of the support body 4, and further causing the end portion 13 of the coil spring 10 to gradually contact the surface 15 projecting from the pivot pin 3.

Figure 4:
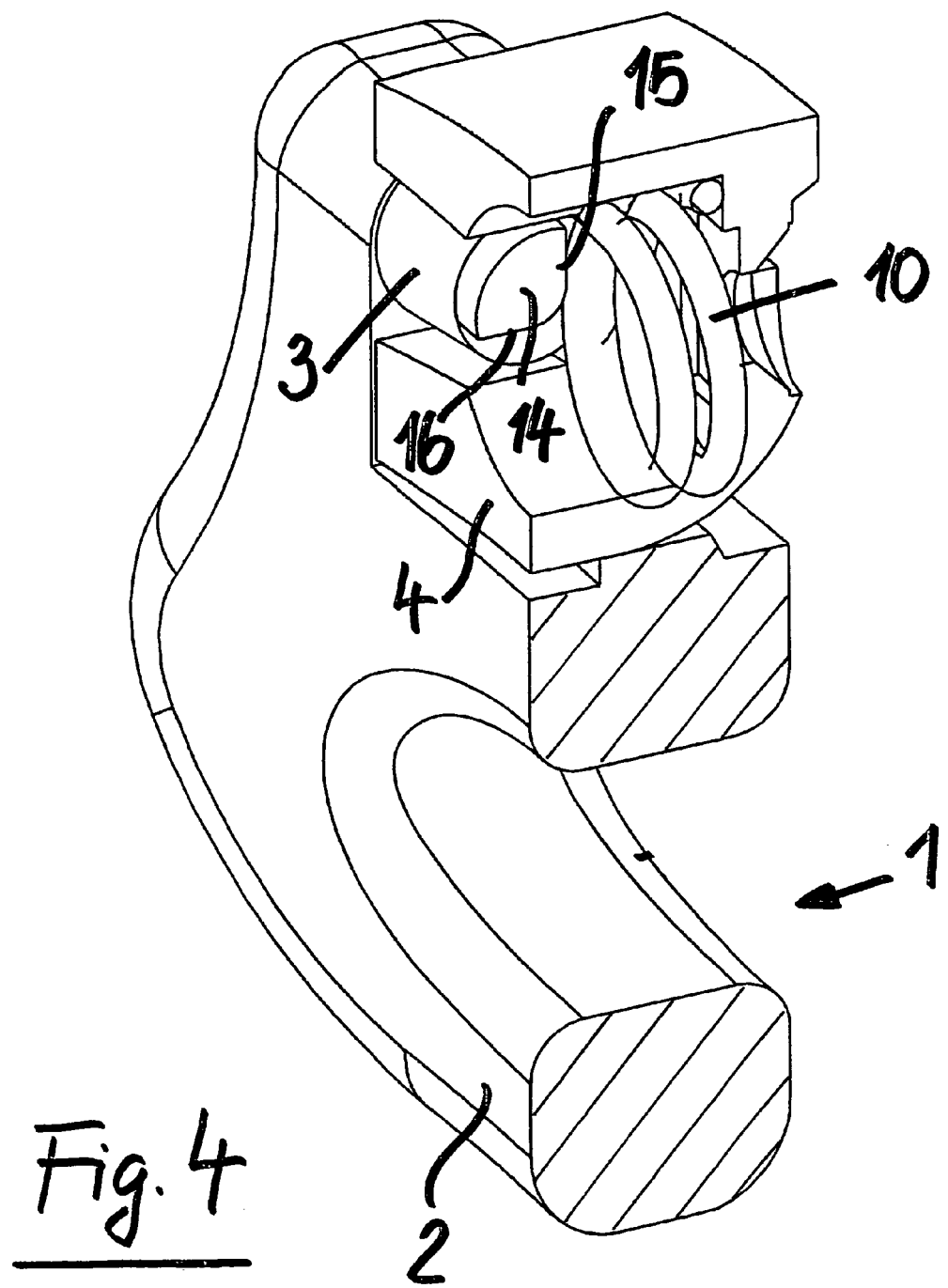
FIG. 4 shows the handle of FIG. 3, from which some mechanical elements have been removed for clarity reasons.

In this position, due to the force applied by the spring 10, the handle will be locked or clamped again as schematically shown in FIGS. 3 and 4, to be arranged in parallel to the outer wall of the kitchen vessel (not shown), thereby allowing the kitchen vessel to be easily stored or stacked in a very small storing space.

The invention claimed is:

1. A swinging handle assembly for a kitchen vessel having a side wall, comprising:
    a stationary support body fixed to the side wall of the vessel and having a chamber;
    a pivotable handle having a pair of elongated arms mounted on the support body for pivoting movement about a pivot axis between a use position in which the arms extend generally radially of the side wall of the vessel, and a storage position in which the arms extend generally parallel to the side wall of the vessel;
    a pair of pivot pins extending toward each other along the pivot axis, each pivot pin being mounted at an end region of a respective arm and being journaled in the support body;

a pair of projections on the respective pivot pins and extending toward each other, each projection having first and second bearing surfaces arranged perpendicular to each other; and a locking spring mounted in the chamber for clamping the handle in each of the use and storage positions, the locking spring having one spring end bearing against the support body in both the use and storage positions, and the locking spring having an opposite spring end bearing against the first bearing surface in the use position to clamp the handle in the use position, and the opposite spring end bearing against the second bearing surface in the storage position to clamp the handle in the storage position.

2. The swinging handle assembly according to claim 1, wherein the handle has a U-shape.

3. The swinging handle assembly according to claim 1, wherein the handle and the support body have respective abutment stops that engage each other in the use position.

4. The swinging handle assembly according to claim 1, wherein the handle is constituted of a thermally insulating material.

* * * * *